US012012935B2

(12) United States Patent
Grunnet et al.

(10) Patent No.: US 12,012,935 B2
(45) Date of Patent: Jun. 18, 2024

(54) CONTROLLING NOISE EMISSIONS FROM INDIVIDUAL BLADES OF A WIND TURBINE

(71) Applicant: Vestas Wind Systems A/S, Aarhus N. (DK)

(72) Inventors: Jacob Deleuran Grunnet, Tranbjerg J (DK); Erik Sloth, Rønde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 70 days.

(21) Appl. No.: 17/618,555

(22) PCT Filed: Jun. 17, 2020

(86) PCT No.: PCT/DK2020/050173
§ 371 (c)(1),
(2) Date: Dec. 13, 2021

(87) PCT Pub. No.: WO2020/259770
PCT Pub. Date: Dec. 30, 2020

(65) Prior Publication Data
US 2022/0243700 A1  Aug. 4, 2022

(30) Foreign Application Priority Data
Jun. 24, 2019  (DK) .......................... PA 2019 70395

(51) Int. Cl.
*F03D 7/02*  (2006.01)
*F03D 7/04*  (2006.01)

(52) U.S. Cl.
CPC ......... *F03D 7/0296* (2013.01); *F03D 7/0224* (2013.01); *F03D 7/045* (2013.01);
(Continued)

(58) Field of Classification Search
CPC ...... F03D 7/0296; F03D 7/0224; F03D 7/045; F03D 7/048; F03D 7/024; F05B 2260/96
See application file for complete search history.

(56) References Cited

U.S. PATENT DOCUMENTS

2011/0123330 A1  5/2011  Matesanz Gil
2011/0175356 A1*  7/2011  Nielsen ................ F03D 7/0296
290/44

(Continued)

FOREIGN PATENT DOCUMENTS

CA  2805498 A1  8/2013
CN  103244351 A  8/2013

(Continued)

OTHER PUBLICATIONS

English translaiton of ES2357077 by PE2E Oct. 12, 2023.*
(Continued)

*Primary Examiner* — Deming Wan
(74) *Attorney, Agent, or Firm* — Wood Herron & Evans LLP

(57) ABSTRACT

The present invention provides a method and controller for controlling noise emissions from individual blades (18) of a wind turbine (10), the method (60) comprising defining (720) a wind turbine model (321) describing dynamics of the wind turbine (10), the wind turbine model (321) including a description of intensity and direction of noise emissions from each individual blade (18) as a function of azimuthal angle (312); and applying (730) a model-based control algorithm (32) using the wind turbine model (321) to determine at least one control output (331), and using (740) the at least one control output (331) to control noise emissions from each individual blade (18).

15 Claims, 8 Drawing Sheets

(52) U.S. Cl.
CPC .......... *F03D 7/048* (2013.01); *F05B 2260/96* (2013.01); *F05B 2270/32* (2013.01); *F05B 2270/327* (2013.01); *F05B 2270/329* (2013.01); *F05B 2270/333* (2013.01)

(56) References Cited

U.S. PATENT DOCUMENTS

| | | |
|---|---|---|
| 2013/0209220 A1 | 8/2013 | Nielsen |
| 2014/0017081 A1 | 1/2014 | Esbensen et al. |
| 2014/0219795 A1* | 8/2014 | Honhoff ............... F03D 7/0296 416/9 |
| 2015/0147175 A1 | 5/2015 | Stoltenjohannes et al. |
| 2016/0032892 A1 | 2/2016 | Herrig et al. |
| 2016/0032893 A1 | 2/2016 | Herrig et al. |
| 2017/0356421 A1 | 12/2017 | Petitjean et al. |
| 2017/0370751 A1* | 12/2017 | Mann ..................... G06F 30/23 |
| 2018/0128242 A1 | 5/2018 | Obrecht et al. |

FOREIGN PATENT DOCUMENTS

| | | |
|---|---|---|
| EP | 2177755 A2 | 4/2010 |
| EP | 2762721 A2 | 8/2014 |
| EP | 3096006 A1 | 11/2016 |
| EP | 3276164 A2 | 1/2018 |
| ES | 2357077 T3 * | 4/2011 .......... F03D 7/0224 |
| WO | 0077395 A1 | 12/2000 |
| WO | 2017174089 A1 | 10/2017 |

OTHER PUBLICATIONS

China National Intellectual Property Administration, office action issued in corresponding Chinese Patent Application No. 202080046150. X, mailed Apr. 15, 2023, with Englsih translation.

European Patent Office, International Search Report and Written Opinion in PCT Application No. PCT/DK2020/050173, Oct. 16, 2020.

Filios et al: "Broadband noise radiation analysis for an HAWT rotor", Renewable Energy, Pergamon Press, Oxford, GB, vol. 32, No. 9, Mar. 6, 2007, (Mar. 6, 2007), pp. 1497-1510, XP005916421, ISSN: 09601481, Doi: 10.1016/J. RENENE.2006.10.002.

Cotte B: "Extended source models for wind turbine noise propagation", The Journal of the Acoustical Society of America, American Institute of Physics for the Acoustical Society of America, New York, NY, US, vol. 145, No. 3, Mar. 13, 2019 (Mar. 13, 2019), pp. 1363-1371, XP012236182, ISSN: 0001-4966, DOI: 10.1121/1. 5093307 [retrieved on Mar. 13, 2019].

Danish Patent and Trademark Office, Search and Examination Report in PA 2019 70395, Jan. 6, 2020.

* cited by examiner

CONTROLLING NOISE EMISSIONS FROM INDIVIDUAL BLADES OF A WIND TURBINE

FIELD OF THE INVENTION

The present invention relates generally to controlling noise emissions from individual blades of a wind turbine.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g. wind shear or turbulence, or may be caused by changing operation of the wind turbine, e.g. grid loss.

It is known that wind turbines generate sound or noise from different sources. For example, mechanical sources include drivetrain tonality and methods are known for reducing such mechanically-induced noise levels. Aerodynamic acoustic sources typically originate from airflow around the rotor blades, and may be the largest component of wind turbine noise emissions. Aerodynamic acoustic mechanisms include low frequency sound, inflow turbulence sound and blade self-noise. Low frequency sound may occur when a rotating blade encounters wake airflow or wind speed changes. Inflow turbulence sound may result from pressure fluctuations caused by turbulent wind. Blade self-noise may result from air flowing along the blade surface. Methods are known for reducing the average aerodynamic acoustic noise from the various sources mentioned above.

The variation in noise level over the rotation of a wind turbine rotor may be referred to as amplitude modulated aerodynamic acoustic noise. Such amplitude modulated noise may typically be generated from an inhomogeneity in the wind field such as wind shear or possibly because of pitch control actions. Methods for reducing amplitude modulated aerodynamic acoustic noise have the potential to add undue complexity to wind turbine control systems.

It is against the above background to which the present invention is set.

SUMMARY OF THE INVENTION

According to an aspect of the present invention there is provided a method of controlling noise emissions from individual blades of a wind turbine. The method may comprise defining a wind turbine model describing dynamics of the wind turbine, where the wind turbine model may include a description of intensity and direction of noise emissions from each individual blade as a function of azimuthal angle. The method may comprise applying a model-based control algorithm using the wind turbine model to determine at least one control output. The method may comprise using the at least one control output to control noise emissions from each individual blade.

The wind turbine model may describe noise emissions from each of a plurality of blade sections of each individual blade.

The wind turbine model may describe noise emissions based on a dipole radiation pattern.

The direction of noise emissions may be determined in dependence on relative positions of leading and trailing edges of each individual blade.

The noise emissions may be determined in dependence on rotor speed.

In some embodiments, describing noise emissions from each individual blade comprises determining wind speed as a function of azimuthal angle.

In some embodiments, wind speed as a function of azimuthal angle is based on blade load for individual blades.

In some embodiments, applying the model-based control algorithm comprises predicting noise emissions of each individual blade over a prediction horizon using the wind turbine model. In some embodiments, applying the model-based control algorithm comprises determining the at least one control output based on the predicted noise emissions.

The method may comprise using the predicted noise emissions in a cost function of the wind turbine model. The method may comprise optimising the cost function to determine the at least one control output.

The cost function may include one or more penalty parameters associated with the predicted noise emissions to penalise one or more of: amplitude modulated aero-acoustic noise emissions from individual blades; noise emissions in one or more particular directions relative to nacelle orientation; and, noise emissions in one or more particular geographic directions.

The at least one control output may be determined in dependence on at least one of: terrain type in the vicinity of the wind turbine; geographic location of the wind turbine; habitat location relative to the wind turbine; atmospheric conditions; and, time of day.

The at least one control output may include pitch control of individual blades.

According to another aspect of the present invention there is provided a non-transitory, computer-readable storage medium storing instructions thereon that when executed by a processor causes the processor to perform the method described above.

According to another aspect of the present invention there is provided a controller for controlling noise emissions from individual blades of a wind turbine. The controller may be configured to define a wind turbine model describing dynamics of the wind turbine, where the wind turbine model may describe intensity and direction of noise emissions from each individual blade as a function of azimuthal angle. The controller may be configured to apply a model-based control algorithm using the wind turbine model to determine at least one control output. The controller may be configured to use the at least one control output to control noise emissions from each individual blade.

According to another aspect of the present invention there is provided a controller for controlling noise emissions from a wind farm comprising a plurality of wind turbines. The controller may be configured to define a wind turbine model describing dynamics of each of the plurality of wind turbines. Each wind turbine model may describe intensity and direction of noise emissions from each individual blade of each wind turbine as a function of azimuthal angle. The controller may be configured to apply a model-based control algorithm using the wind turbine models to determine at least one control output for each of the wind turbines. The controller may be configured to use the at least one control output to control noise emissions from each individual blade of each of the wind turbines.

According to another aspect of the present invention there is provided a wind turbine comprising a controller as described above.

According to another aspect of the invention there is provided a wind farm comprising a plurality of wind turbines each having a controller as described above. The wind farm may comprise a wind farm controller configured to: determine an allowable level of noise emissions from the wind farm based on one or more received noise parameters; determine a noise emission constraint based on the allowable level of noise emissions; and distribute the noise emission constraint to each of the controllers of the wind turbines. Each of the controllers of the wind turbines may be configured to apply the model-based control algorithm using the wind turbine model to determine at least one control output subject to the distributed noise emission constraint. The wind farm controller may determine a different noise emission constraint for each of the wind turbines in the wind farm.

BRIEF DESCRIPTION OF THE DRAWINGS

One or more embodiments of the invention will now be described by way of example with reference to the accompanying drawings, in which.

DETAILED DESCRIPTION

Figure 1:
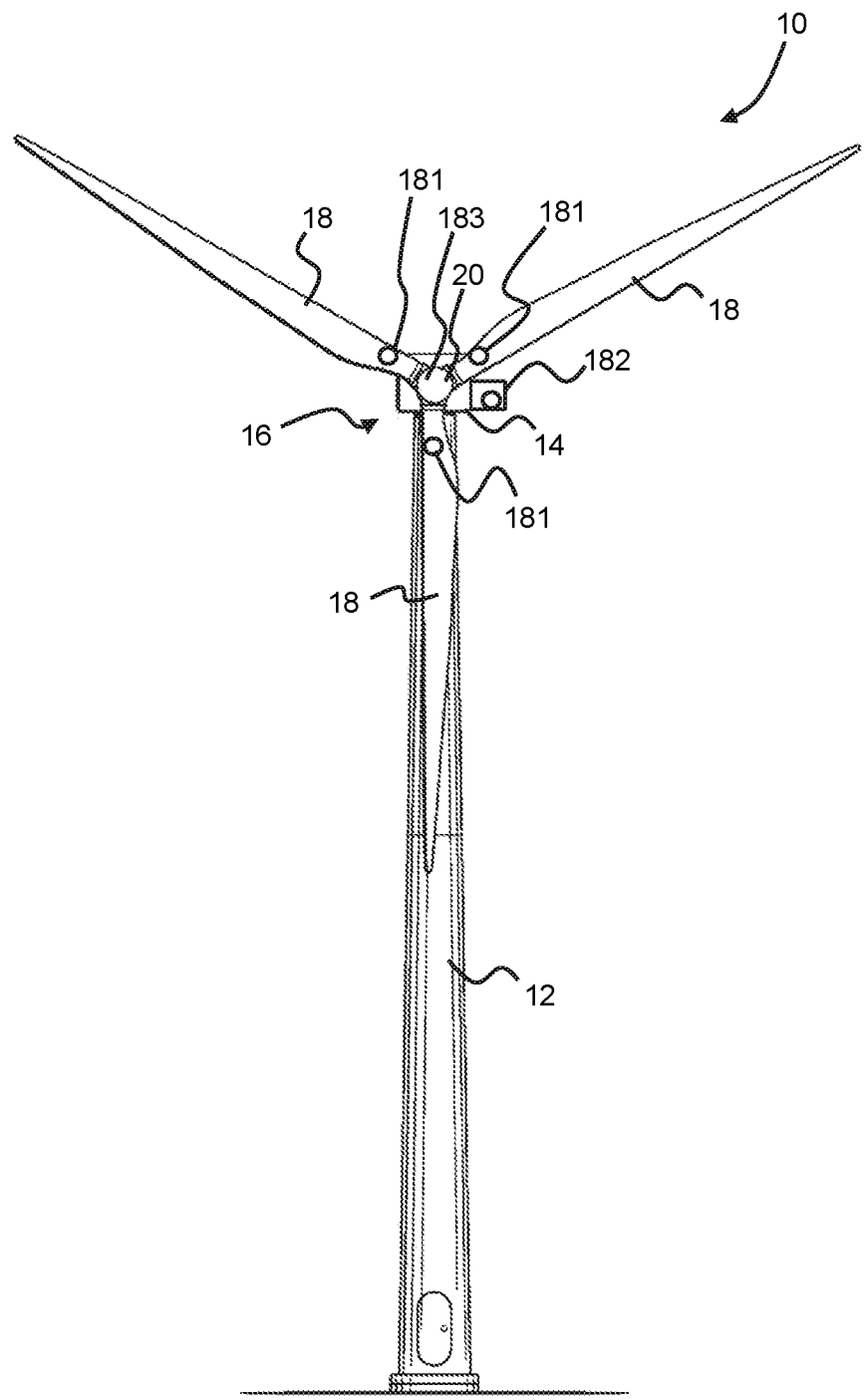
FIG. 1 shows a wind turbine according to an example of the invention.

FIG. 1 shows a wind turbine 10 in which an embodiment of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 although other configurations are possible.

Shown within each blade 18 is a blade load sensor 181 (in other examples there may be multiple blade load sensors allowing blade loads to be represented by more than a single variable). The sensing element may be a fibre optic strain gauge, a resistive strain gauge, or any other appropriate detector. A rotor wind speed detector 182 is also shown—again, this measurement may be performed in several ways as the skilled person will appreciate, one being through LI DAR as the skilled person will appreciate from the literature of wind turbine design and control. A rotational speed sensor 183 is also shown—this may be, for example, in the form of a rotary encoder on a generator shaft of the turbine 10; however, the rotor speed may be determined in any suitable manner.

Figure 2:
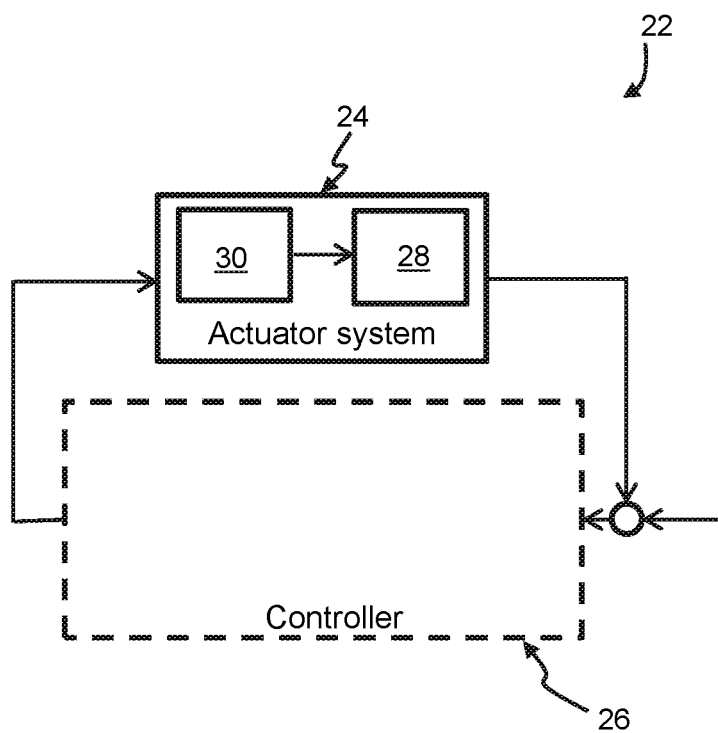
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a controller 26. In this particular embodiment, the actuator system 24 may be or comprise a pitch system for controlling the pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28.

It should be appreciated that the controller 26 and actuator system 24 may be replicated for each of the blades 18 of the wind turbine 10 so that the position of each blade 18 may be controlled independently—in examples described here, this is done to provide individual pitch control for each blade 18.

It should be noted at this point that the pitch system of the wind turbine 10 is just one example of a wind turbine system that could be controlled and that the controller 26 could also be used to control other wind turbine systems. For instance, the actuator system 24 may be an electric or hydraulic yaw drive for the nacelle 14 of the wind turbine 10 to provide rotational position control of the nacelle 14 with respect to the tower 12. Another example would be a converter control system where the actuator system 24 may be a power converter of the generation system of the wind turbine 10 that converts AC power delivered by the generator to a variable-frequency AC power output via a DC link in a process known as 'full power conversion'. The skilled person would appreciate that the principle of the invention described herein could be applied to any wind turbine system that requires high speed real time control.

In one example method of the invention, the pitch of individual blades 18 of the wind turbine 10 may be controlled to control noise emissions from the blades 18 during operation of the wind turbine 10. In particular, the intensity and direction of the noise emissions of individual blades 18 may be controlled. A wind turbine model describing intensity and direction of noise emissions from individual blades 18 is defined. In the described example, an estimate of local wind speed for the individual blades 18 is determined as a function of azimuthal angle of the blades, and these local wind speeds are used to model the blade noise emissions. In the described example, the noise emissions of each individual blade is predicted over a prediction horizon using the wind turbine model, and the predicted noise emissions are used in a cost function or performance function that is optimised to determine individual pitch to control the pitch of the individual blades 18. By controlling pitch individually for each blade in this manner, overall amplitude modulated aerodynamic acoustic noise from the blades—i.e. noise variation over the rotation of the rotor blades 18—or noise in a particular direction at a certain blade azimuthal angle, may be reduced effectively even in complex environmental conditions. This is described in greater detail below.

Figure 3:
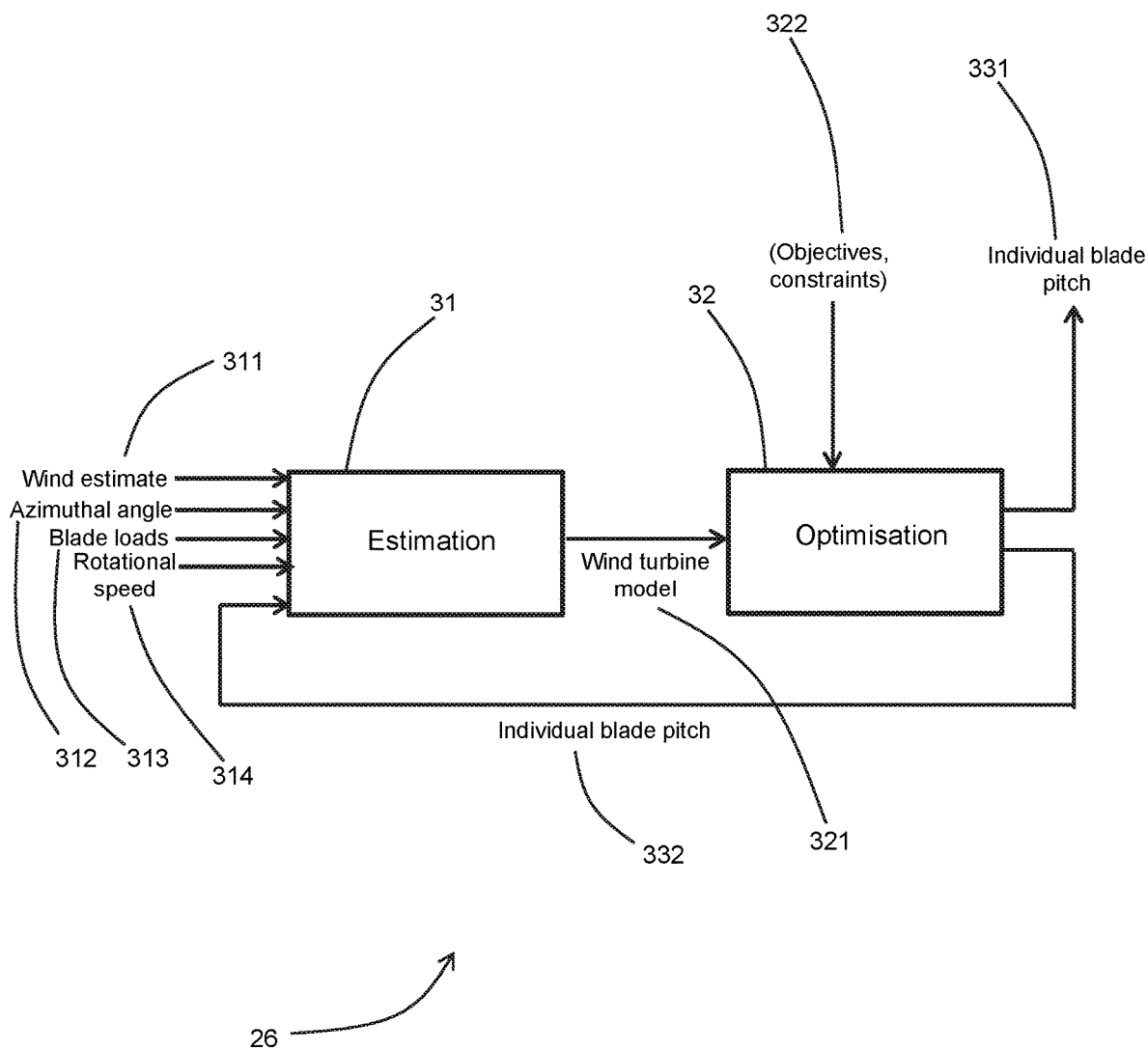
FIG. 3 shows component parts of the controller of FIG. 2, in particular an estimator unit and a model predictive control unit according to an example of the invention.

A specific example implementing this approach in the controller 26 is shown schematically in FIG. 3. Two functional elements are shown—an estimation unit 31 (or, simply, an estimator 31) and a model predictive control unit or optimisation unit 32. Both of these units may be provided by suitable software running on any suitable computing substrate using conventional or customer processors and memory. The estimator unit 31 and the optimisation unit 32 may use a common computing substrate (for example, they may run on the same server) or separate substrates, or one or both may themselves be distributed between multiple computing devices.

In the described example, the estimator unit 31 receives as inputs a wind speed estimate 311, blade load values 313 from the blade load sensors 181 for each blade 18 with associated azimuth angles 312, and rotor speed 314 from the rotational speed sensor 183. Individual blade pitch 332 derived as an output from the optimisation unit 32 as a predicted trajectory over the prediction horizon is also fed back to the estimator unit 31. The output from the estimator unit 31 includes a wind turbine model 321 including a description of noise emissions from individual blades 18 over a prediction horizon, as discussed below, and this is fed into the optimisation unit 32 as an input. The optimisation unit 32 provides individual blade pitch control 331 for the wind turbine 10 according to an optimisation result determined subject to a number of objectives and constraints 322. In particular, the optimisation is performed subject to one or more constraints regarding noise emissions from the individual blades 18.

This approach is effective as it allows for convex optimisation of the control model, despite the overall non-linearity of the functions describing the forces acting on the blades that result in amplitude modulated aero-acoustic noise emissions from the blades. Convex optimisation generally requires a linear system, so model predictive control has typically been limited in its objective by the need to obtain an effective optimisation. Pitch control of the individual blades 18 to control noise emissions from the individual blades 18 is possible because this approach allows non-linearity to be addressed in the estimator unit 31 enabling the model of the model predictive control unit 32 to have individual blade pitch outputs while based on a model capable of convex optimisation. The non-linearity is contained instead within the wind speeds and loads experienced by each blade 18 over the prediction horizon.

Figure 4A:
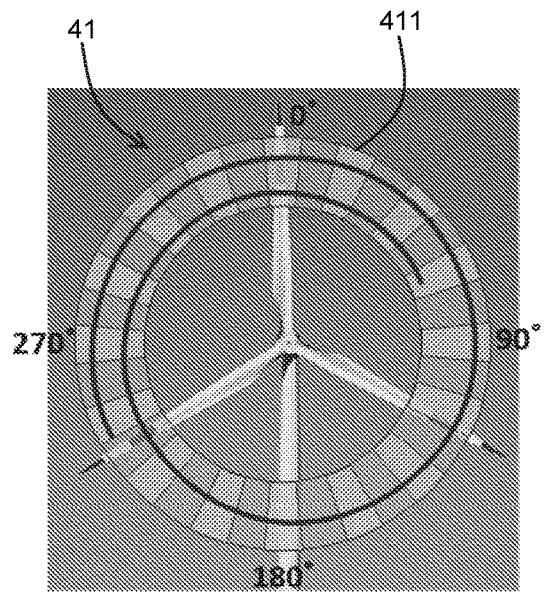
FIG. 4A shows an azimuthal map of wind turbine blade position.

Calculation of the local wind speed is now described, with the local wind speed then being used to create a model for the noise emissions generated by individual blades 18. FIG. 4A illustrates how a disc 41 around the rotor 20 may be represented as a plurality of rotor positions 411 each with its own azimuthal angle. For estimating local wind speed, the estimator 31 uses an unknown input observer adapted to estimate a system state variable on the basis of a state model and measurements over time. The estimator 31 may use Kalman filtering, for example an Extended Kalman Filter (EKF), although the skilled person will appreciate other forms of unknown input estimator functions may be used. Blade aerodynamics will typically be nonlinear, requiring the use of an approach that is adapted for use in nonlinear systems.

The EKF relies on a model and on time varying inputs. The model is a model of the physical system of the wind turbine 10 allowing calculation of relevant outputs from the available inputs. Key inputs are the blade load values 313 for each blade 18, and the rotor wind estimate 311. The rotor wind estimate 311 is an estimate of the wind speed averaged over the rotor 20 as a whole. The rotor wind estimate can be derived in one of a number of ways: use of an anemometer on the nacelle 14 as a representative measurement for the rotor as a whole; calculation from known pitch angle, rotational speed and grid power values (for example by look up in the Cp table); or by an estimation process. The physical model allows wind speed experienced by a blade 18 to be determined from the blade load value 313 and the overall rotor wind estimate 311, based on an engineering analysis of the physical system.

Figure 4B:
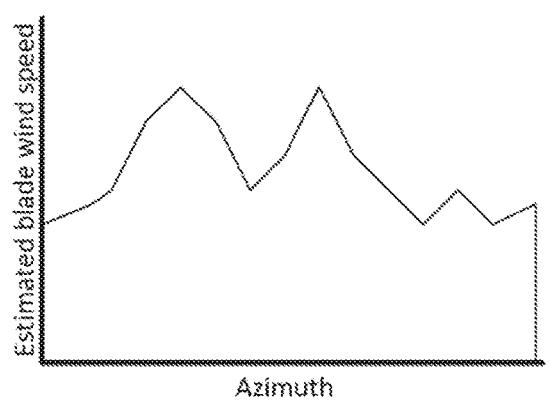
FIG. 4B shows a map of blade wind speed for azimuthal position.

This approach allows for determination of wind speed for each azimuthal position, providing a wind value map for each blade 18 according to azimuthal position. Values of the estimator 31 are updated when a blade 18 moves through the relevant azimuthal position resulting in relevant input values—such as blade load 313—being updated. The output of the EKF is a map of local wind speed against azimuthal angle, as illustrated in FIG. 4B.

Figure 4C:
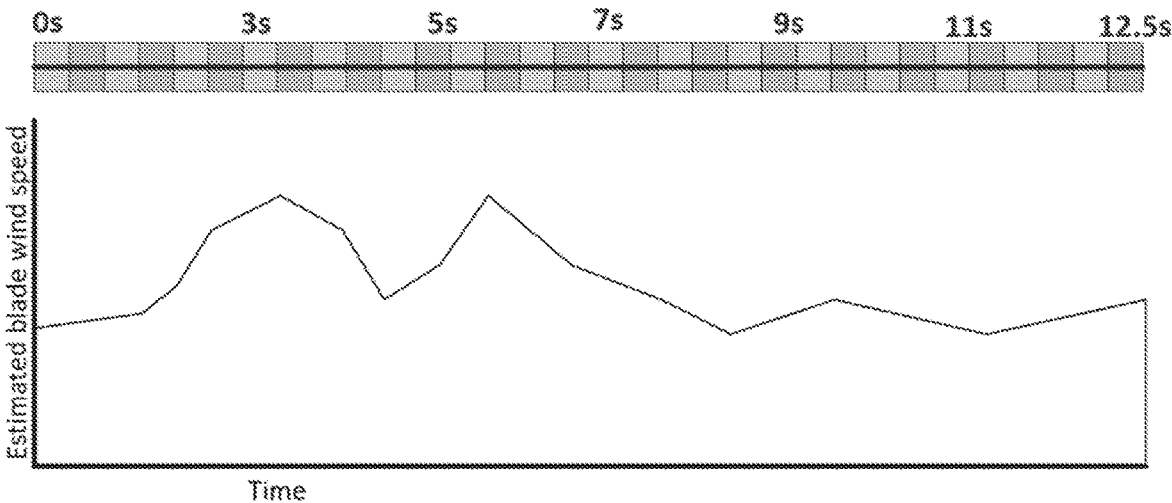
FIG. 4C shows a map of estimated blade wind speed for a given blade over a prediction horizon.

The estimator 31 uses the wind value map derived from the EKF and uses current rotor azimuth angle 312 and predicted rotor speed as further inputs to enable the position of each blade 18 to be detected over a future period. The estimator 31 is therefore able to produce a local wind speed experienced for each blade 18 over its path over a prediction horizon, as illustrated in FIG. 4C. This prediction horizon will be set to be sufficiently long to allow for effective model predictive control but sufficiently short that there will still be reasonable confidence in the accuracy of the predicted values throughout the prediction period.

The estimated blade local wind speeds may then be used to create a model for noise emissions for each individual blade 18. The noise emission model may then be used in the wind turbine model 321 describing dynamics of the wind turbine 10 (including blade noise emissions) which in turn is used in the optimisation problem.

Figure 5:
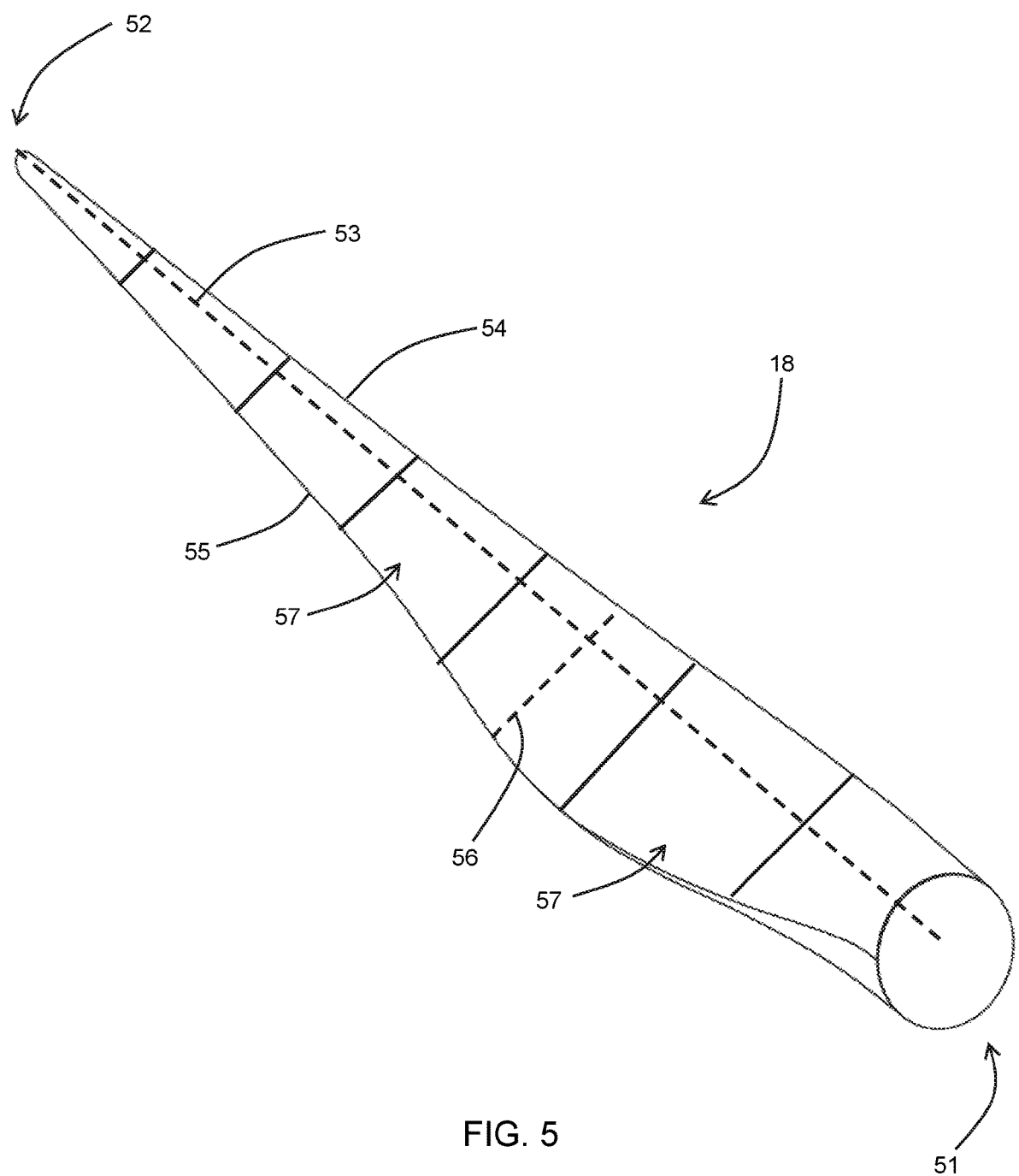
FIG. 5 shows a perspective view of one of the rotor blades of the wind turbine of FIG. 1.

FIG. 5 shows one of the individual blades 18 of the wind turbine 10, generally having an aerofoil profile. In particular, FIG. 5 indicates the root end 51—for attaching to the rotor 20—and the tip 52—at an end opposite to the root 51—of the blade 18, with the blade span 53 being defined between the root 51 and tip 52. The blade 18 has leading and trailing edges 54, 55 defining a blade chord 56 therebetween.

For the present example, the blade 18 is divided into a plurality of blade sections 57 along the blade span 53. The blade noise emissions for each blade section 57 are described for inclusion in the model as the noise emission will vary along the blade span 53. The blade 18 may be divided up into any suitable number of blade sections 57 along the span 53. A greater number of blade sections 57 along the blade 18 may result in a more accurate description of blade noise emissions; however, this may increase the computational resources needed to perform the optimisation of the model.

Figure 6:
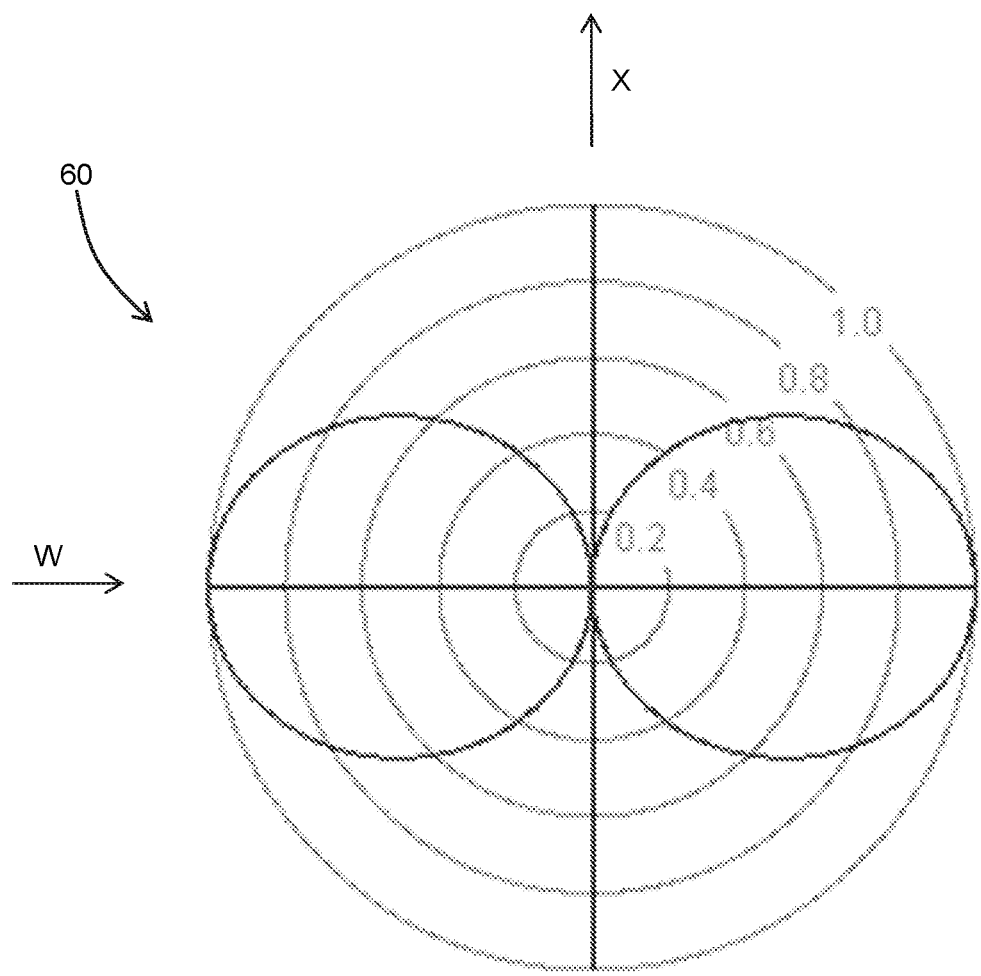
FIG. 6 schematically shows noise emissions from a section of a blade of the wind turbine of FIG. 1 described as a dipole radiation pattern.

The noise emissions from each blade section 57 are modelled as a radio frequency dipole radiation pattern, and an example of such a pattern 60 is illustrated schematically in FIG. 6. That is, the noise emissions from the blade sections 57 are assumed to behave like a dipole sound source. The dipole pattern 60 indicates that the noise emissions from a blade section 57 are highly directional. The particular direction and intensity of noise emissions from a blade section 57 at a particular time step will depend on many different parameters. In the schematic example of FIG. 6, this may be the noise emission pattern for a blade that is pitched into the wind with the direction W being from left to right as indicated in FIG. 6 and the rotor plane X of the wind turbine 10 being as indicated in FIG. 6. The schematic dipole pattern 60 is symmetrical about the plane X; however, in general this would not be the case. It is noted, however, that the noise emissions are much stronger in some directions than others. In the illustrated example, the direction along the plane X is where the lowest level of noise from the blade section 57 is emitted. In the example shown in FIG. 6, the noise emissions are determined as a two-dimensional map or pattern; however, this may readily be extended to three dimensions in other examples.

The dipole or noise map 60 for each section 57 of a particular blade will vary along the blade 18, in particular the size and direction of the dipole 60. This is because the dipole 60 for each blade section 57 at a particular time instant is determined based on a number of parameters including the blade azimuthal position 312, blade pitch angle, rotational speed 314 and blade local wind speed. For example, the rotational speed of a blade section 57 near to the blade root 51 will be less than the rotational speed of a blade section 57 near to the blade tip 52. The relative locations of the leading and trailing edges 54, 55 will determine the orientation of the dipole pattern, i.e. the direction in which the noise emissions from a blade section are largest. The direction of the noise emissions is also highly dependent on the instantaneous azimuthal angle of the blade section 18.

At a given time step, the operating state is sampled to give measurements and/or estimates of the various operating parameters, including blade local wind speed which is estimated as described above, and a noise emission map for each blade section 57 is determined or simulated based on the current operating state. This may be used to determine a total noise emission map, including acoustic intensity and noise direction, for each blade 18 and for the wind turbine 10. The noise emission map or model in the described example is quasi-static, which allows for the inclusion of the blade noise emission dynamics in the wind turbine model without adding complexity that could render the optimisation algorithm computationally infeasible. Note that the noise emission map is calculated on-line in real time. Although this requires a relatively high amount of computational power, this has the benefit of being able to make use of instantaneous wind speeds for improved accuracy. In different examples, however, the noise emission map could be calculated off-line.

Figure 7:
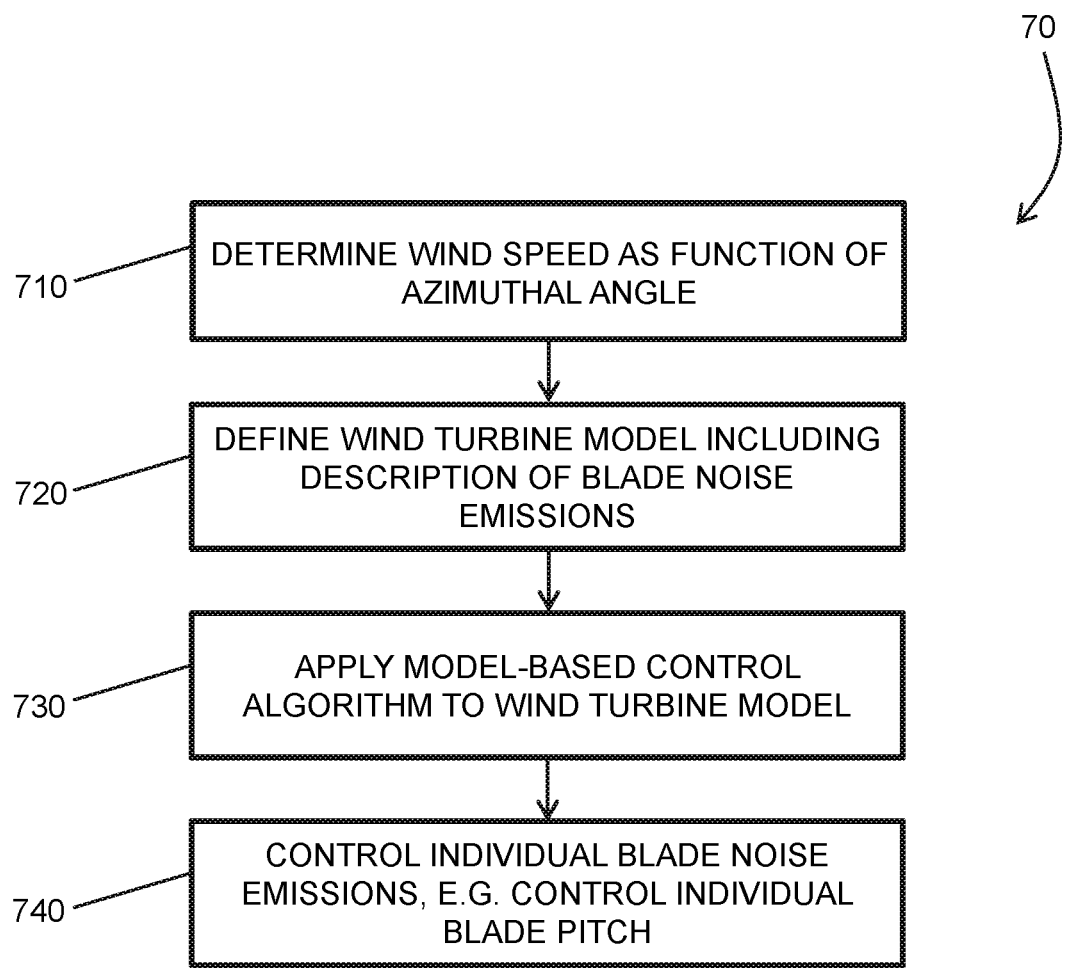
FIG. 7 outlines the method steps executed by the controller of FIG. 2 according to an example of the invention; and, FIG. 8 schematically illustrates a wind farm having a plurality of the wind turbines of FIG. 1, and adjacent to a habitat location.

FIG. 7 outlines the steps of a method 70 performed by the controller 26 to maximize power output of the wind turbine 10 while maintaining blade noise emissions below allowable levels. At step 710, the controller 26 determines the blade local wind speeds as a function of azimuthal angle, as described above.

At step 720, a wind turbine model describing dynamics of one or more components of the wind turbine 10 is defined. In particular, the noise emission map described above—which is determined based on various parameters including blade local wind speed—is included in the wind turbine model. As well as including a description of intensity and direction of noise emissions from each individual blade 18 as a function of azimuthal angle 312, the wind turbine model may include descriptions of one or more of tower vibrations, tilt and/or yaw loading, and tower clearance control, and generated power output of the wind turbine 10. The wind turbine model may also include descriptions of other wind turbine dynamics.

At step 730, model-based control algorithm is applied to the wind turbine model to determine control outputs to control the wind turbine based on the inputs to the wind turbine model at the particular sampling instant. In the described example, a predictive control algorithm, specifically a model predictive control algorithm, is applied to generate the control outputs. The controller 26 uses the defined wind turbine model to predict trajectories of one or more variables of the wind turbine model over a prediction horizon based on received input values or parameters for each of a finite number of time steps from a current time step. In particular, the input parameters include estimated blade noise emissions, including direction and intensity. The blade noise emissions map is predicted over the prediction horizon in the estimation unit 31 for an optimal trajectory over time. In the described example, the wind turbine model describes blade noise emissions as a function of blade local wind speed. The blade local wind speed is predicted over the prediction horizon as described above and as illustrated in FIG. 4C. The predicted blade noise emissions over the prediction horizon are then determined from the predicted blade local wind speed over the prediction horizon. The predicted wind turbine model 321 is input into the optimisation unit 32. The optimisation unit 32 also receives the various objectives and constraints 322 on which the optimisation is to be based. A number of various constraints on the blade noise emissions may be imposed, as well as constraints on other turbine dynamics.

At step 740, the optimisation problem is solved in the optimisation unit 32 using the wind turbine model and subject to the objectives and constraints, predicted or otherwise. In particular, the predicted wind turbine behaviour, including the predicted blade noise emissions, is used in a cost function, which is then optimised subject to the constraints, including any constraints on blade noise emissions, to determine at least one control output 331 to control blade noise emissions. In particular, the pitch of individual blades 18 may be controlled to control individual blade noise emissions and, by extensions, noise emissions of the entire wind turbine 10. Specifically, the optimisation problem is solved according to a model predictive control algorithm to determine the optimal trajectories for each of the model variables. The model predictive control algorithm determines control outputs over the prediction horizon for controlling the wind turbine 10 to operate according to the optimal trajectories. Typically, in a model predictive control approach only the control outputs corresponding to the first time step over the prediction horizon are then implemented by the controller 26. The method steps are then repeated to determine the control outputs to be implemented at the next time step.

Embodiments and examples of the present invention are advantageous in that a description of noise emissions, in particular the direction thereof, of individual blades of a wind turbine may be included in a wind turbine model to which a model-based control algorithm is applied so that the control output is determined in a manner in which noise emissions are taken into account. In particular, by including a description of how the direction of noise emissions from a blade varies as the rotor rotates, i.e. for different blade azimuthal angles, control outputs such as blade pitch of individual blades can be controlled to control noise emissions in a desired manner. For example, the noise emissions in certain directions relative to nacelle orientation can be reduced by controlling individual blade pitch over the rotation of the rotor. Alternatively, or in addition, the level of variation in blade noise emissions over a single rotation of the rotor may be reduced, i.e. amplitude modulation aeroacoustic noise may be reduced.

Embodiments and examples of the invention are advantageous in that an average power output of a wind turbine can be maintained while controlling blade noise emissions to reduce their impact on the surroundings. For instance, noise emissions may be controlled, e.g. by controlling individual blade pitch, so that a greater amount of blade noise is emitted in a vertical direction than in a horizontal direction. For example, a wind turbine may be located adjacent or close to a habitat (whether that is a human habitat such as a village or town, or whether it is an animal habitat such as a forest). In such a case, the wind turbine model can take into account a geographical location and/or nacelle orientation of the wind turbine relative to habitat and control noise emissions appropriately, for example reduce noise emissions in a direction from the wind turbine towards the habitat so that noise emission are instead directed in a different direction, e.g. vertically away from the wind turbine.

Apart from relative geographic position, further parameters may be taken into account as constraints on blade noise emissions in the wind turbine model. For instance, the wind turbine controller may have knowledge of (in-built or by measurement or estimation) of one or more of the type of terrain in the vicinity of the wind turbine, the atmospheric conditions in the vicinity of the wind turbine, and the time of day. For example, different types of terrain may reflect generated sound signals to different degrees such that generated noise emissions may travel further depending on the type of terrain around the wind turbine, meaning that the blade noise emissions may need to be controlled to be lower for a turbine in the vicinity of terrain have relatively large sound reflectivity. Similarly, generated blade noise may travel different distances in different atmospheric conditions, and hence this may be taken into account when controlling noise emissions. The time of day may impact on allowable level of noise emissions, e.g. if a wind turbine is close to a habitat then the allowable noise emissions during the night may be lower than during the day.

Embodiments and examples of the invention are advantageous in that wind turbine power output may be increased or maximised in certain conditions, e.g. relatively benign weather conditions, that naturally result in lower noise emissions, particularly lower amplitude modulated aeroacoustic noise. In such a case, wind turbine operation may be stepped up to increase power output while staying within allowable noise emission levels.

Embodiments and examples of the invention are advantageous in that the effects of wind shear, changeable wind direction, and turbine and blade wear, all of which may contribute to relatively large (periodic) noise variations, may be compensated for by controlling blade noise emissions over the rotation of the rotor, thereby reducing amplitude modulated aero-acoustic noise.

Embodiments and examples of the invention in that it allows for a trade-off between blade or turbine loads against corresponding noise emissions to be made. For instance, a slightly higher level of noise emissions may be permissible to reduce loading on the wind turbine blades provided the noise emissions do not exceed allowable levels.

Figure 8:
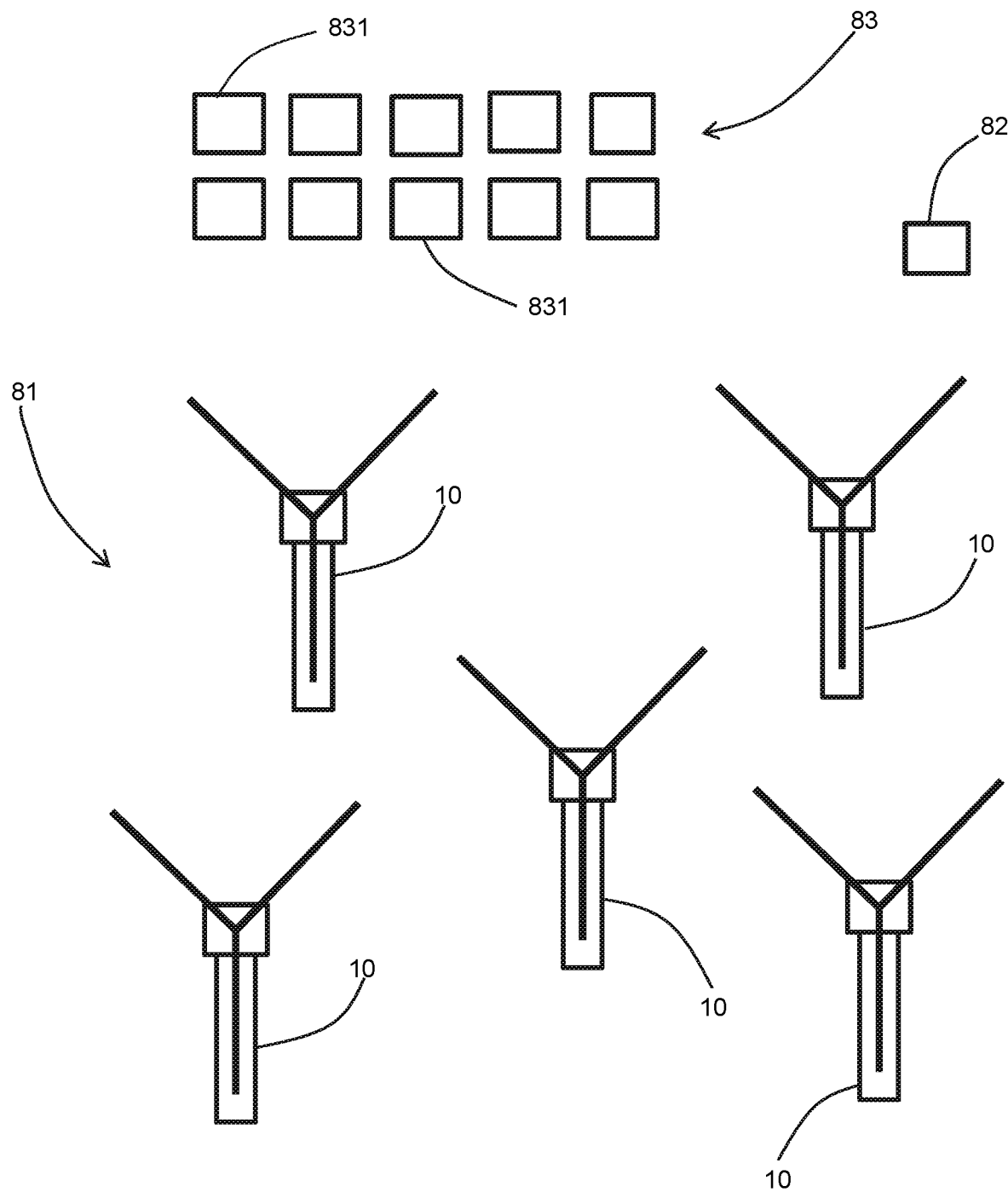

FIG. 8 schematically illustrates a wind farm or wind park 81 having a number of the wind turbines 10 according to an example of the invention. In particular, each of the turbines 10 has a controller 26 for controlling blade noise emissions as described above. In addition to, or instead of, each wind turbine 10 solving the optimisation problem subject to constraints on noise emissions at an individual turbine level, there may be constraints on the noise emissions generated by the wind farm 81 as a whole. A controller or optimiser 82 operating at the level of the wind farm 81 may be used to develop a noise emission model that distributes allowable noise constraints to each wind turbine 10 in the wind farm 81. The controller 82 may be located at the wind farm 82 or remote from it.

Many of the noise parameters used to determine the noise constraints that are distributed to the individual turbines 10 may be the same as those mentioned above as being dealt with on an individual turbine level rather than a wind farm level. For example, a geographic position of the wind farm 81 relative to a habitat location (e.g. including houses 831) may be considered by the wind farm controller 82 in a wind farm model that determines allowable noise emissions from the wind farm 82 towards the habitat 83, and then distributes noise constraints for each turbine 10 so that the overall allowable wind farm noise emissions does not exceed an overall allowable value. The wind farm controller 82 may distribute noise constraints such that a turbine 10 in the wind farm 10 closest to the habitat 83 has a lower level of permissible blade noise generation than a turbine 10 furthest from the habitat 83. Similarly, overall noise constraints based on terrain type, wind turbine location, atmospheric conditions and time of day may be considered or modelled at wind farm level with determined constraints being distributed to the individual turbines 10 in the wind farm 81.

Many modifications may be made to the above-described embodiments without departing from the scope of the present invention as defined in the accompanying claims.

In the above-described example, a predictive control method, in particular a model predictive control method, is used to determine at least one control output, e.g. individual blade pitch, for controlling noise emissions from the wind turbine. In different examples, however, the method used to determine the control output(s) need not be a predictive control method and may instead be a general model-based control method. Examples of such methods may include a linear-quadratic regulator (LQR) control method, a linear-quadratic-Gaussian (LQG) control method, and an H-infinity control method.

In the above-described example, each of the individual blades is divided into a plurality of sections and noise emissions from each of the sections is predicted and used in the optimisation problem to determine blade pitch control of the individual blades. Each blade may be divided into any number of suitable sections or, in some examples, the blades may not be divided into section and instead a noise emission map for an entire blade may be predicted and used in the optimisation problem.

In the present invention, knowledge of the direction of a noise source, i.e. directivity of the blade noise emissions, is needed. In the above-described example, the direction (and associated intensity) of blade noise emissions is modelled based on the above-described dipole radiation pattern model. In different examples, however, any suitable model for the direction and intensity of blade noise emissions may be used. Furthermore, in addition, or alternatively, the direction and/or intensity of blade noise emissions may be measured directly, e.g. using microphones or other suitable sensors proximate to the blades.

The invention claimed is:

1. A method of controlling noise emissions from individual blades of a wind turbine, the method comprising:
   defining a wind turbine model describing dynamics of the wind turbine, the wind turbine model including a description of intensity and direction of noise emissions from each individual blade as a function of azimuthal angle; and
   applying a model-based control algorithm using the wind turbine model to determine at least one control output, and using the at least one control output to control at least a directionality of the noise emissions from each of the individual blades.

2. The method according to claim 1, wherein each of the individual blades is formed by a plurality of blade sections, wherein the wind turbine model describes noise emissions from each of the plurality of blades sections of each of the individual blades, and wherein the noise emission from each of the individual blades is determined based on the noise emissions from their respective plurality of blade sections.

3. The method according to claim 1, wherein the wind turbine model describes noise emissions based on a dipole radiation pattern.

4. The method according to claim 1, wherein the direction of noise emissions is determined in dependence on relative positions of leading and trailing edges of each of the individual blades.

5. The method according to claim 1, wherein the noise emissions are determined in dependence on rotor speed.

6. The method according to claim 1, wherein describing the noise emissions from each individual blade comprises determining wind speed as a function of azimuthal angle.

7. The method according to claim 6, wherein wind speed as a function of azimuthal angle is based on blade load for each of the individual blades.

8. The method according to claim 1, wherein applying the model-based control algorithm comprises:
predicting noise emissions of each individual blade over a prediction horizon using the wind turbine model; and,
determining the at least one control output based on the predicted noise emissions.

9. The method according to claim 8, the method comprising using the predicted noise emissions in a cost function of the wind turbine model, and optimising the cost function to determine the at least one control output.

10. The method according to claim 9, wherein the cost function includes one or more penalty parameters associated with the predicted noise emissions to penalise one or more of:
amplitude modulated aero-acoustic noise emissions from each of the individual blades;
noise emissions in one or more particular directions relative to nacelle orientation; and,
noise emissions in one or more particular geographic directions.

11. The method according to claim 1, wherein the at least one control output is determined in dependence on at least one of:
terrain type in the vicinity of the wind turbine;
geographic location of the wind turbine;
habitat location relative to the wind turbine;
atmospheric conditions; and,
time of day.

12. The method according to claim 1, wherein the at least one control output includes pitch control of each of the individual blades.

13. A controller for controlling noise emissions from individual blades of a wind turbine, the controller being configured to:
define a wind turbine model describing dynamics of the wind turbine, the wind turbine model describing intensity and direction of noise emissions from each individual blade as a function of azimuthal angle; and
apply a model-based control algorithm using the wind turbine model to determine at least one control output, and use the at least one control output to control at least a directionality of the noise emissions from each of the individual blades.

14. A wind turbine comprising a controller according to claim 13.

15. A wind farm comprising:
a plurality of wind turbines each having a controller according to claim 13; and
a wind farm controller configured to: determine an allowable level of noise emissions from the wind farm based on one or more received noise parameters; determine a noise emission constraint based on the allowable level of noise emissions; and distribute the noise emission constraint to each of the controllers of the wind turbines,
wherein each of the controllers of the wind turbines is configured to apply the model-based control algorithm using the wind turbine model to determine at least one control output subject to the distributed noise emission constraint.

* * * * *